July 7, 1953            F. T. IRGENS            2,644,420
OUTBOARD MOTOR MOUNTING FOR DAMPING TORSIONAL VIBRATION
Filed April 19, 1951
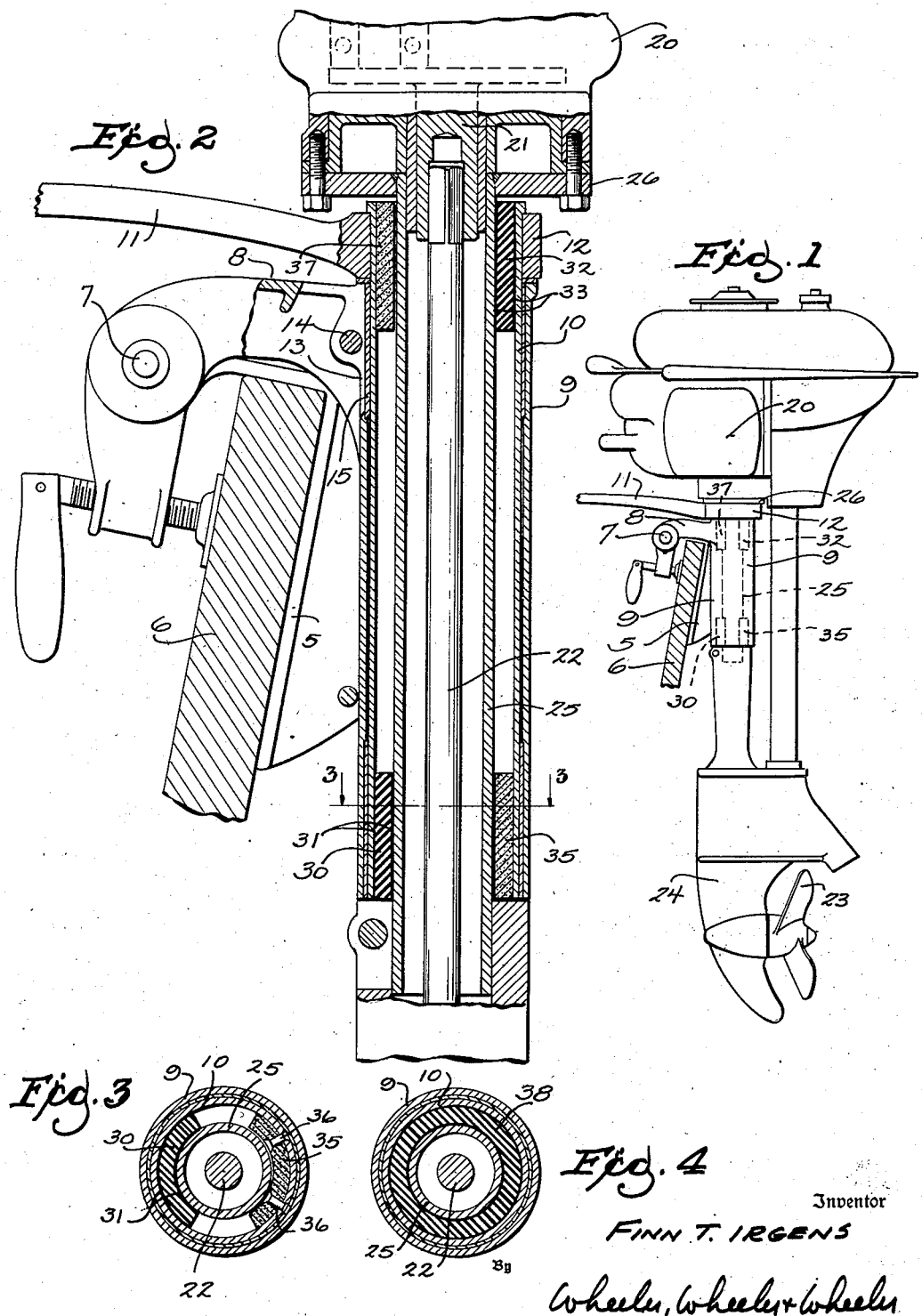
Inventor
FINN T. IRGENS
Wheeler, Wheeler & Wheeler
Attorneys Patented July 7, 1953

2,644,420

UNITED STATES PATENT OFFICE 2,644,420

OUTBOARD MOTOR MOUNTING FOR DAMPING TORSIONAL VIBRATION

Finn T. Irgens, Wauwatosa, Wis., assignor to Outboard, Marine & Manufacturing Company, Waukegan, Ill., a corporation of Delaware Application April 19, 1951, Serial No. 221,924

8 Claims. (Cl. 115—18)

This invention relates to an outboard motor mounting for damping torsional vibration.

Conventional outboard motors comprise a power unit assembly rotatable on an upright axis for steering and sometimes for reversing. This assembly is pivoted to the bracket, and usually comprises all other parts of the outboard motor, such as the engine, the submersible gear housing, the strut connecting these parts, the driving and propeller shafts in suitable mountings, the muffler and exhaust, and the engine cooling, carburetor, and ignition devices. The fuel tank is generally included in the unit but may be separate.

The axis of the engine crank shaft and the drive shaft usually coincide with, or are parallel to, the axis upon which the motor rotates bodily. As is well known, the engine piston and connecting rods deliver torque to the shaft during the power stroke and absorb torque from the shaft during the compression stroke, thereby setting up a vibration having a component which tends to oscillate the entire assembly aforesaid upon its steering axis.

The art is well aware of the desirability of avoiding the transmission of torque vibration to the tiller handle during normal operation. To that end, it has been taught in previous patents that the tiller itself may be swiveled directly on the mounting bracket, with rubber cushions or other torsional springs intervening between the tiller and the strut or shaft housing subject to torque vibration, thus permitting such assembly to oscillate freely while friction between the tiller and the bracket tends to hold the tiller against participation in the torque vibration of said assembly.

Such an arrangement adequately absorbs the torque vibration at normal engine speeds, inasmuch as the two-cycle engines commonly used are usually operated at many thousand R. P. M., at which speed the amplitude of the torque vibration is very slight. However, at very slow speeds, such as are frequently used in trolling for fish, the low frequency of the torque vibration tends to coincide with the low natural period of the mounting cushions or other torque springs with the result that the amplitude becomes very excessive and it may become difficult to control the tiller or the assembly.

The present invention seeks to overcome this difficulty by providing a damping or braking mechanism which is automatically effective at low speeds and substantially or completely ineffective at high speeds, the effectiveness of the braking or damping operation being automatically controlled as a function of the thrust exerted by the outboard motor propeller. In that part of the mounting toward which the motor thrust is exerted, I place whatever cushioning is used and in that part of the mounting from which the thrust tends to displace the shaft housing or strut, I incorporate brake lining or the like against which the shaft housing or strut is normally held by the resilient bias of the cushion so that, at all times when the propeller thrust is low, the cushion will hold the shaft housing or other strut to the brake, which will resist and damp its freedom of oscillation in response to torque vibration. When the propeller thrust is high, the strut or shaft housing will be moved away from the brake, or at least partially relieved of pressure engagement with the brake, so that as the thrust increases, the braking effect becomes less and less and the assembly becomes more and more free to oscillate upon its cushion. The cushion is no longer merely a torsional spring, but is also under radial compression in a fore and aft direction to normally urge the assembly or associated parts subject to torsional vibration against the brake except when such pressure is relieved by the development of substantial propeller thrust.

In the drawings:

Fig. 1 is a view in side elevation of an outboard motor embodying the invention.

Fig. 2 is an enlarged fragmentary detail view in vertical axial section through a portion of the motor shown in Fig. 1.

Fig. 3 is a detail view taken in transverse section through the lower mounting cushion on the line 3—3 of Fig. 2.

Fig. 4 is a view in transverse section through the upper mounting cushion of a slightly modified embodiment.

As will be observed, the outboard motor shown in Fig. 1 is externally conventional in appearance. There is a mounting bracket 5 adapted to be clamped to the transom 6 of a boat to be propelled. Pivoted at 7 to the mounting bracket is an arm 8 which supports a bearing sleeve 9 in which the tiller sleeve 10 is rotatable. The tiller 11 has a clamping ring 12 encircling the sleeve 10 for transmitting thereto the control movements of the tiller. The bearing sleeve may be slotted at 13 and drawn together by bolt 14 to exert frictional pressure on the bushing 15 of tiller sleeve 10, whereby friction between the tiller sleeve and the bearing sleeve will tend to hold the tiller sleeve stationary while the rest of the motor vibrates.

The motor comprises an engine 20 which has a crank shaft at 21 in driving connection with the vertical drive shaft 22 which transmits motion to the propeller 23. The propeller gear casing 24 is connected with a shaft housing 25 through which the vertical drive shaft 22 passes downwardly. A plate or head 26 at the upper end of the drive shaft supports the engine. Thus, the entire driving assembly which comprises the engine 20, the shaft housing 25 and the gear housing 24 is connected as a unit for oscillation in response to torque vibration. Where, as here, the axis of such unit coincides with the steering axis, the entire vibratory torque, and not just a component thereof, tends to oscillate the aforesaid unit assembly upon the steering axis.

To accommodate torque vibration, while nevertheless maintaining the aforesaid unit assembly under tiller control, I provide at least one, and desirably two, torsionally yieldable mounting springs at points axially spaced vertically of the shaft housing. At least the lower spring desirably comprises a rubber cushion 30 which is preferably arcuate in form, as best shown in Fig. 3, and does not extend continuously around the shaft housing 25. The cushion 30 is desirably designed to transmit steering motion from the tiller sleeve to the shaft housing and thus may be bonded in some manner both to the shaft housing 25 or the tiller sleeve 10, the bond here being represented by vulcanization at 31 to the tiller sleeve and housing. The radial thickness of the block of natural or synthetic rubber used at 30 is such that with the parts assembled, the rubber cushion is maintained under slight fore and aft radial compression so that its reaction tends to urge the shaft housing rearwardly from the central position in which it is illustrated in Fig. 3.

Rearward displacement of the shaft housing is impossible because of a block 35 of frictional material such as asbestos brake lining compound which is interposed behind the strut or housing 25 between it and the tiller sleeve 10 and is connected with one or the other. The connection illustrated comprises rivets 36 securing the block 35 of brake compound to the inner periphery of the tiller sleeve.

When the thrust of propeller 23 is exerted in the normal forward direction indicated by the arrow in Fig. 1, such thrust tends to further compress the elastic cushion 30. If the thrust is low, as when the engine is operated at low speed, the cushion will resist compression and the braking action of the block 35 upon the shaft housing 25 will remain effective. As the engine speed increases and the propeller thrust is correspondingly increased, the cushion 30 will be progressively compressed and the reaction pressure of the shaft housing 25 against the brake block 35 will be progressively reduced, thus correspondingly reducing the friction between these parts. Finally, at full speed, the compression of the cushion may be such that the friction between the shaft housing and the brake block will either be very largely reduced or wholly eliminated, so that all damping action of the brake block 35 upon the free oscillation of the motor and shaft housing assembly unit will become non-existent, leaving such unit perfectly free for oscillation in response to torque vibration.

At low speeds, when the damping action of the brake block is most effective, the torque vibration will obviously be transmitted through the tiller sleeve to the tiller and through the friction clamp at 13 and 14 to the bracket and the boat. While it is not desired to subject either the tiller or the boat to vibration, the force of the torque vibration at low engine speeds is relatively so slight that the undesirable transmission of the vibration to the tiller handle and the boat is less objectionable than the erratic movement of the engine and shaft housing assembly which occurs if the excessive amplitude at low speed is undamped.

The mounting of the shaft housing and engine unit at the top of the tiller sleeve may, as shown in Fig. 2, be the exact converse of that described, there being an arcuate elastic cushion at 32 bonded at 33 to the tiller sleeve rearwardly of the shaft housing, as well as to the housing. The brake block 37 is disposed between the shaft housing and the tiller sleeve forwardly of the tiller sleeve. The reason for the interchanged locations of the cushion and brake block as compared with the positions of the corresponding parts 30 and 35 at the lower mounting is to be found in the fact that the propeller thrust tends to pivot the entire oscillatory unit upon cushion 30 so that the upper end of the shaft housing is pushed by the thrust rearwardly rather than forwardly. Thus, by conversely locating the cushion and the brake block at the upper mounting, the effect of the upper mounting supplements that of the lower mounting in damping torque vibration at low engine speeds while leaving the engine and shaft housing and gear housing assembly free to oscillate as a unit in response to torque vibration when the power thrust is high as happens at high engine speeds.

The brake block may be omitted from one or both of the mountings. If it is to be used on but one, it will ordinarily be used on the lower one as shown in Fig. 3. The mounting from which the brake block is omitted may have any desired cushioned support such as the continuous cushion ring shown at 38 in Fig. 4. In such a case, the engine and shaft housing unit tend to be cradled or universally cushioned in the ring 38 in the upper mounting, the ring 38 opposing resiliently the torsional displacement of the unit, and also accommodating a slight fore and aft bodily pivotal oscillation of such unit in order to free the strut 25 from frictional pressure engagement with the brake block 35 in the lower mounting at times when the propeller thrust is high.

I claim:

1. In an outboard motor mounting for damping only at relatively low speed the free oscillation of an oscillatably mounted power and propelling unit in response to torque vibration, the combination with a pair of spaced sleeves, one of which comprises a part of said unit, of braking means connected with one of said sleeves and normally engaged with the other, and means interposed between the opposite sides of said sleeves yieldably biasing said other sleeve and said braking means into mutual engagement, the said braking means and yieldable biasing means being disposed opposite each other in the plane in which propelling thrust is developed, and said biasing means being disposed in the direction toward which such thrust is developed.

2. The device of claim 1 in which said biasing means further comprises an elastic cushion connected with one of said sleeves and bearing upon the other and elastically resisting torque displacement between said sleeves.

3. In an outboard motor comprising an engine, an upright strut and a propeller gear casing connected as a unit, said unit carrying a propeller and driving connection thereto from said engine, and a bracket provided with bearing means pivotally supporting said unit, the combination with a steering member constituting a part of said unit oscillatable in said bearing, and a bearing member coaxial with the steering member and having a portion spaced therefrom, of mounting means between said members comprising an arcuate elastic cushion aligned with propeller thrust and subject to radial compression under propeller thrust and connected with one of said members in resilient pressure engagement with the other, and a brake block interposed between said members diametrically opposite the cushion and subject to compression between said members by the reaction of said cushion, said brake block being connected with one of said members and in frictional engagement with the other.

4. The device of claim 3 in further combination with a second mounting between said members at a point axially spaced from the mounting first mentioned and comprising an elastic torque-resisting cushion.

5. The device of claim 4 in which said second mounting further comprises a second brake block diametrically opposite said cushion, the brake block of said second mounting being at the opposite side of the inner member from the brake block of the first mounting and both of said brake blocks being in positions rearwardly of the direction in which the inner member is displaced respecting the outer member by the thrust of the outboard motor propeller.

6. In an outboard motor, the combination with a mounting, of a power unit for which said mounting provides a yieldable bearing, the power unit being yieldable in said bearing to an extent depending upon its speed and power of operation and being subject to oscillatory vibration when in operation, in further combination with braking means comprising surfaces connected respectively with said mounting and unit and normally engaged to damp the vibration of said unit in the position occupied by said unit before it yields in said bearing, the relative positions of said surfaces being such that the surface connected with the unit moves in the yielding of the unit in a direction of progressively decreased contact with the surface connected with the mounting whereby its effect in damping such vibration decreases as the power unit yields in said bearing.

7. In an outboard motor, the combination with a power unit, of a mounting for said power unit, which mounting is provided with supporting means in which said power unit is yieldable from a normal retracted position in the direction of thrust developed by the power unit during its operation, and vibration damping brake means including friction parts respectively connected with said mounting and said unit and normally in pressure contact in the retracted position of the unit, the part connected with the unit being movable thereby in a direction to reduce its pressure upon the part connected with mounting as the unit moves responsive to thrust, the said brake being progressively less effective upon said power unit as said power unit yields from said retracted position in response to increasing thrust developed by it.

8. In an outboard motor, the combination with a power unit subject to torsional vibration and including an engine, a propeller, driving connections and a strut member supporting the propeller and connections and upon which the engine is carried; of a mounting for said unit provided with a bearing support on which said unit is mounted for yielding movement in the direction of propeller thrust, biasing means connected with the mounting and said unit to act on the unit in opposition to said thrust and adapted to urge said unit toward a normally retracted position from which it is yieldable subject to said thrust and in opposition to said biasing means when said engine develops predetermined power and accordingly increases propeller thrust, and a vibration damping brake including a first part connected with said unit and having a brake surface oscillatory in the vibration of said unit and a second part connected with said mounting and having a relatively non-oscillatory surface in a position to be engaged by the oscillatory surface of the first part when said unit is in its said retracted position, the thrust-induced movement of said unit from its retracted position against said biasing means decreasing the braking effect; and the movement of said unit subject to said biasing means toward said retracted position in response to a reduction of thrust serving to force together the respective surfaces of said parts for increasing braking action.

FINN T. IRGENS.

References Cited in the file of this patent

UNITED STATES PATENTS

| Number | Name | Date |
|---|---|---|
| 2,256,831 | Karey | Sept. 23, 1941 |
| 2,354,445 | Grubbs | July 25, 1944 |
| 2,400,032 | Talbot | May 7, 1946 |
| 2,462,272 | Martin | Feb. 22, 1949 |
| 2,582,397 | Schwartz | Jan. 15, 1952 |